(12) United States Patent
Bailey

(10) Patent No.: US 6,286,489 B1
(45) Date of Patent: Sep. 11, 2001

(54) SYSTEM AND METHOD OF CONTROLLING EXHAUST GAS RECIRCULATION

(75) Inventor: Brett M. Bailey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/550,874

(22) Filed: Apr. 17, 2000

Related U.S. Application Data

(63) Continuation-in-part of application No. 09/209,603, filed on Dec. 11, 1998, now abandoned.

(51) Int. Cl.[7] .................................................. F02M 25/07
(52) U.S. Cl. ........................... 123/568.11; 123/568.12; 123/568.21
(58) Field of Search ..................... 123/58.8, 568.11, 123/568.12, 568.17, 568.18, 568.19, 568.2, 568.21; 701/108

(56) References Cited

U.S. PATENT DOCUMENTS

| | | | |
|---|---|---|---|
| 4,041,910 | * 8/1977 | Houseman | 123/58.8 |
| 4,108,114 | * 8/1978 | Kosaka et al. | 123/58.8 |
| 4,131,095 | * 12/1978 | Ouchi | 123/58.8 |
| 5,178,119 | * 1/1993 | Gale | 123/568.12 |
| 5,517,976 | * 5/1996 | Bachle et al. | 123/568.12 |
| 5,802,846 | * 9/1998 | Bailey | 123/568.12 |
| 5,894,726 | * 4/1999 | Monnier | 123/568.11 |
| 6,209,530 | * 4/2001 | Faletti et al. | 123/568.21 |

* cited by examiner

*Primary Examiner*—Willis R. Wolfe
(74) *Attorney, Agent, or Firm*—Keith P. Roberson

(57) ABSTRACT

An improved method and system for controlling exhaust gas recirculation on an internal combustion engine broadens the operating range. The system includes a plurality of combustion chambers, a recirculation combustion chamber, fuel delivery device, engine condition sensing device, and controller. The system measures engine condition to determine a total fuel mass to meet engine condition. The system then uses the recirculation manifold to set volume of recirculated air and adjusts fuel delivery to the recirculation manifold to set quality of the recirculated gas. The remainder of fuel is divided generally equally among the plurality of combustion chambers.

16 Claims, 3 Drawing Sheets

SYSTEM AND METHOD OF CONTROLLING EXHAUST GAS RECIRCULATION

This application is a continuation-in-part of application Ser. No. 09/209,603 filed Dec. 11, 1998, abandoned.

TECHNICAL FIELD

The present invention relates generally to an internal combustion engine and specifically to a method of controlling an exhaust gas recirculation system.

BACKGROUND ART

Future regulations on emissions require significantly reduced production of pollutants from an internal combustion engine. Engine manufacturers have responded by developing a number of methods and systems directed at reducing pollutants. Exhaust gas recirculation (EGR) is a scheme to reduce the formation of NOx, an uncertain mixture of oxides of nitrogen. In an exhaust gas recirculation system, exhaust gas is introduced into the inlet air stream. The exhaust gas replaces a portion of oxygen that would normally occupy a combustion chamber. Reducing oxygen in the combustion chamber slows the combustion process. Slowing the combustion process reduces a peak gas temperature in the combustion chamber. High peak gas temperatures in the combustion chamber are generally associated with the formation of NOx.

Many current exhaust gas control schemes attempt to control a mass of oxygen available for combustion. These systems typically focus on manners of measuring mass flow in the inlet stream and mass flow of recirculated gas. These systems further use control valves to vary the mass flow of recirculated gas using a pressure differential between the inlet air stream and the exhaust gas. Relying on the pressure differential limits the effectiveness of these systems. As inlet air stream pressures increase with increasing loads, less exhaust gas recirculates into the inlet stream. To achieve greatly reduced emissions envisioned by future regulations, exhaust gas must be recirculated over a wider operating range, especially in the high load high speed range where NOx production increases rapidly.

In U.S. Pat. No. 4,426,848 issued to Stachowicz on Jan. 24, 1984, a venturi nozzle expands the operating range of the exhaust gas recirculation system. The venturi nozzle creates a reduced pressure area in the inlet stream where the exhaust gas may be introduced. However, these systems reduce the effectiveness of a pressure charging device and ultimately reduce engine performance. In U.S. Pat. No. 5,517,976 issued to Bachle on May 21, 1996, a single piston or group of pistons forces exhaust gas into the inlet stream wherein the pistons act as positive displacement pumps. This system provides a fixed volumetric percentage of recirculated exhaust gas. In a low load condition at low speeds, the air to fuel ratio may be so low that using the fixed volumetric percentage of exhaust gas may prevent proper combustion. The present invention is directed at overcoming one or more of the problems set forth above.

DISCLOSURE OF THE INVENTION

In one aspect of the present invention a method of controlling an exhaust gas recirculation system in an internal combustion engine improves operation over a broad engine range. The method involves determining an operating condition of the engine. Based on the engine operating condition, a controller determines a total mass of fuel for the determined operating condition. The controller than distributes the total mass of fuel to the combustion chambers and recirculation combustion chamber in non-equal proportions according to the operating condition with the recirculation combustion chamber receiving a larger proportion of the total mass of fuel where the engine operates in a predetermined upper range. The recirculation combustion chamber receives an equal proportion of the total mass of fuel where the engine operates in a predetermined middle range. In a lower operating range, the recirculation combustion chamber receives a smaller proportion of the total.

In another aspect of the present invention, a system improves control of exhaust gas recirculation in an internal combustion engine. The system comprises a plurality of combustion chambers. An exhaust system and an inlet system fluidly connect with the combustion chambers. A recirculation combustion chamber fluidly connects with the inlet system. An engine operating condition sensing device connects to the engine. The engine operating sensing device is adapted to sense an engine operating condition. A fuel deliver device is fluidly connected with the combustion chambers and the recirculation combustion chamber. A controller connects to the fuel delivery device. The controller determines a total mass of fuel according to a sensed engine operating condition. The controller determines an equal proportion of the total mass of fuel to be delivered to each of the combustion chambers and the recirculation combustion chamber. The controller adjusts the equal proportion of the total mass to be delivered to the combustion chambers inversely with said sensed operating condition. The controller adjusts the equal proportion of the total mass of fuel to be delivered to the recirculation combustion chamber in direct relation with the sensed operating condition.

BEST MODE FOR CARRYING OUT THE INVENTION

Figure 1:
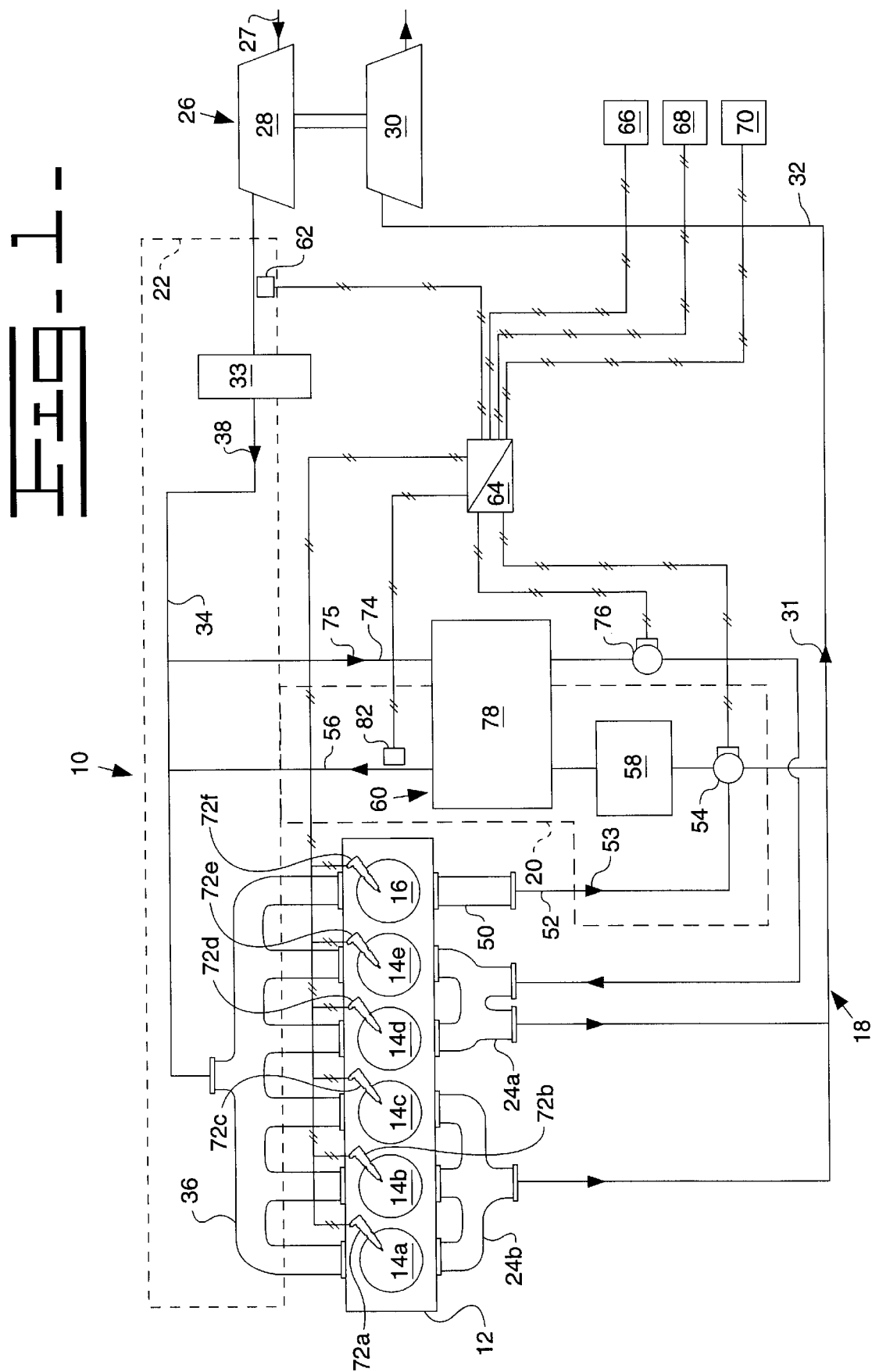
FIG. 1 is a schematic drawing of an exhaust gas recirculation system embodying the present invention.

The schematic in FIG. 1 has as its base an internal combustion engine 10. In this application the engine 10 is made up of an engine block 12 having five combustion chambers 14a, 14b, 14c, 14d, 14e, and a recirculation combustion chamber 16. While this represents an inline six cylinder engine, this system would work equally well with an inline or "V" engine having any number of cylinders. The combustion chambers 14a–e connect to an exhaust system 18. The recirculation combustion chamber 16 connects to an EGR system 20. The engine 10 also has an inlet system 22 connected to the combustion chambers 14a–e and recirculation combustion chamber 16.

The illustrated exhaust system 18 has a front exhaust manifold 24a and rear exhaust manifold 24b. Alternative engines may use a single exhaust manifold. Combustion chambers 14a–c connect to the rear exhaust manifold 24b and combustion chambers 14d–e connect to the front exhaust manifold 24a.

In this application, the engine 10 has a turbocharger 26 having a compressor 28 and a turbine 30. An exhaust conduit 32 carrying an exhaust flow 31 fluidly connects the exhaust manifolds 24a and 24b to an inlet of the turbine 30. An ambient air conduit 27 fluidly connects to an inlet of the compressor 28. An outlet of the compressor 28 fluidly connects to an air-to-air after cooler (ATAC) 33. While in this application an air-to-air after cooler 33 is shown, other similar heat exchanging apparatus including jacket water after cooler will provide the same function. An inlet conduit 34 fluidly connects the air-to-air after cooler 33 to an inlet manifold 36. The inlet conduit 34 carries an inlet flow 38. Combustion chambers 14a–e and 16 are fluidly connected to the inlet manifold 36.

A recirculation manifold 50 fluidly connects to the recirculation combustion chamber 16. While in this case the recirculation manifold 50 is depicted as a separate manifold, it might be included as a part of the front exhaust manifold 24a having a decreased volume passage in the proximity of the recirculation combustion chamber 16 and a separate outlet as part thereof being fluidly connected to a recirculation conduit 52. The recirculation conduit 52 carries a recirculation flow 53. The latter mode reduces the number of parts, cost, and complexity and therefor is the best mode. In either case, the volume of the front exhaust manifold 24a or recirculation manifold 50 should be configured so that the pressure pulse of the exhaust gas resulting in recirculation combustion chamber 16 is not significantly dissipated before entering the recirculation conduit 52. While this representation shows only one combustion chamber 16 fluidly connected to the recirculation manifold 50, more than one of the combustion chambers 14a–e could be fluidly connected to the recirculation manifold 50.

The recirculation conduit 52 fluidly connects the recirculation manifold 50 to an optional EGR valve 54 being variably movable between a first position and a second position. In the first position, the EGR valve 54 fluidly connects the recirculation conduit 52 with the inlet manifold 36. In the second position, the EGR valve 54 fluidly connects the recirculation manifold 50 with the front exhaust manifold 24a. When operatively positioned between the first and second position, the recirculation conduit 52 fluidly connects with both the inlet manifold 36 and the front exhaust manifold 24a. A supply conduit 56 fluidly connects the recirculation manifold 50 to the inlet manifold 36. A particulate trap 58 is located in the supply conduit 56 upstream of an EGR cooling system 60. In this application, the supply conduit 56 fluidly connects to the inlet conduit 34.

In this application, a pressure sensor 62 is operatively positioned in the inlet conduit 34. The pressure sensor 62 provides an input signal to a controller 64. This application shows an electronic controller. A pneumatic or other alternative controller may also be used. The pressure sensor 62 in the inlet conduit 34 provides one manner of determining the load on the engine 10. Other conventional manners such as a temperature sensor operatively positioned in the exhaust system 18, a strain gauge operatively positioned on a work shaft, a sensor for measuring the composition of an exhaust gas, or other similar instruments may also be used determine the load on the engine 10. In addition or as a further alternative to the pressure sensor 62, the internal combustion engine 10 may have other sensors providing inputs into the electronic controller 64 including any one or more of the following: a speed sensor 66, a fuel demand sensing device 68, and/or a fuel delivery sensing device 70. The electronic controller provides an output signal to a plurality of fuel injectors 72a–f fluidly connected to the combustion chambers 14a–e and recirculation combustion chamber 16.

The EGR cooling system 60, as illustrated, includes a bleed conduit 74, an optional bleed valve 76, and an EGR heat exchanger 78. The bleed conduit 74 carries a bleed flow 75 and fluidly connects to the inlet conduit 34 downstream of the air-to-air aftercooler 33. The bleed valve 76 moves between a bleed open position and a bleed closed position. In the bleed open position, the inlet conduit 34 fluidly connects to the front exhaust manifold 24a. However, the bleed conduit 74 could be fluidly connected to the exhaust system 18 anywhere upstream of the turbine inlet 44. In the bleed closed position, the inlet conduit 34 does not fluidly communicate with the exhaust manifold 24a. The bleed conduit 74 is connected to the EGR heat exchanger 78 in a manner to promote heat exchange from the bleed conduit 74 to the EGR heat exchanger 78. The supply conduit 56 is also connected to EGR heat exchanger 78 in a manner promoting heat exchange from the supply conduit 56 to the EGR heat exchanger 78. The electronic controller 64 sends an output signal to the bleed valve 76. In a similar manner, the controller sends an output signal to the EGR valve. Recirculated exhaust gas might also be cooled using a water jacket or other similar heat exchanging device. In this application, the EGR heat exchanger 78 is a recuperative type heat exchanger. optionally, a gas temperature sensor 82 in the supply conduit 56 downstream of the EGR heat exchanger 78 operatively connects to the electronic controller 64.

Figure 3:
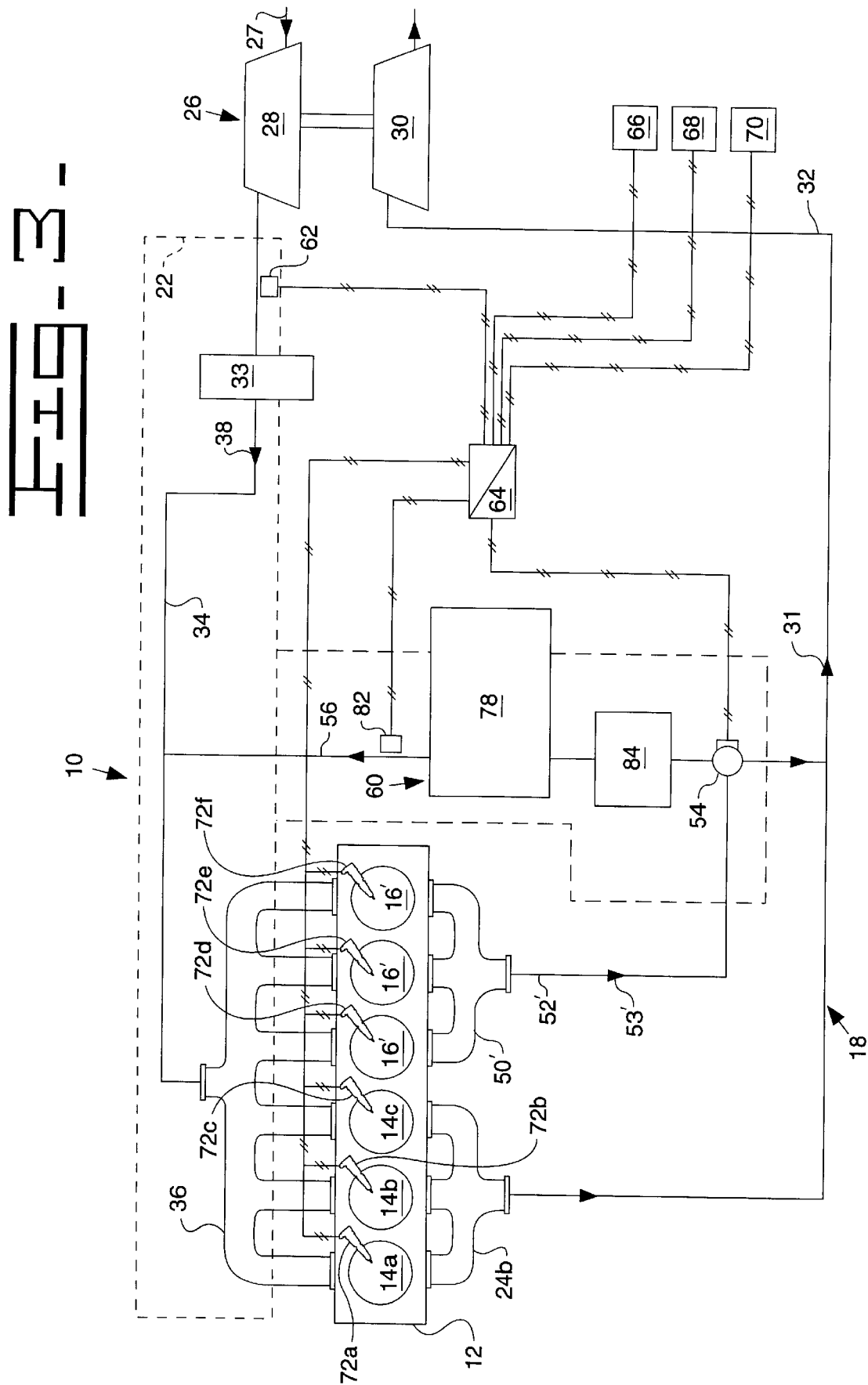
FIG. 3 is an alternative embodiment of the exhaust gas recirculation system.

FIG. 3 shows an alternative embodiment where the recirculation manifold 50' replaces the front exhaust manifold 24a. Further, multiple recirculation combustion chambers 16' connect with the recirculation manifold 50'. The recirculation conduit 52' connects with the EGR valve 54. The supply conduit 56 exiting the EGR valve 54 connects with the inlet conduit 34. The EGR valve 54 also connects with the exhaust conduit 32. In this embodiment a pumping device 84 connects at some location prior to or at the intersection of the supply conduit and the inlet conduit. While a pump 84 is shown, other systems may use a venturi, exhaust gas driven compressor, dynamics of piston movement as shown above, or other similar systems.

Industrial Applicability

The EGR system 24 and method of operation reduces NOx by a substantial amount. Unlike existing systems, NOx is reduced while improving engine performance throughout the entire operating range of the engine 10. This EGR system 20 allows for a variable mass of exhaust gas to be introduced in the inlet air system 22 without using additional valves.

Using the recirculation manifold 50 in conjunction with the recirculation combustion chamber 16, the EGR system 20 introduces exhaust gas into the inlet system 22 without the added cost, added weight, or pressure losses associated with venturi. Reducing pressure losses preserves energy used to compress the inlet air. The efficiency of the EGR system 20 is further improved passing inlet flow 38 through air-to-air aftercooler 32 and routing bleed flow 53 from the inlet flow 38 into the bleed conduit 74. Bleed flow 53 is then directed into the turbine 38 of the turbocharger 28. The bleed flow 75 replaces the recirculation flow 53 to maintain a generally fixed exhaust flow 31 to the turbocharger 28.

Figure 2:
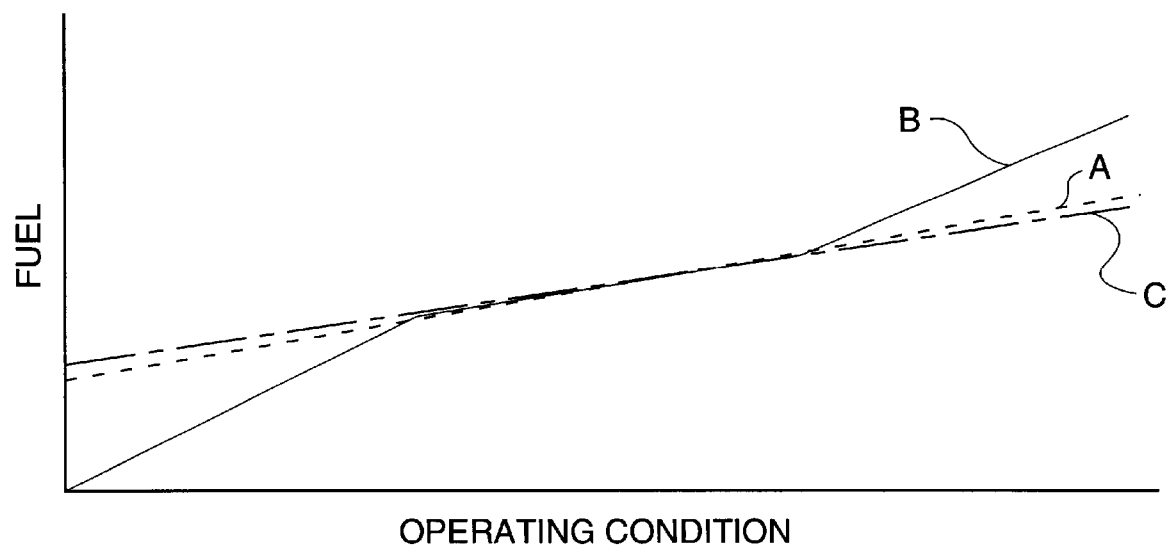
FIG. 2 is a graph illustrating a comparison of fuel delivery according to the present invention with conventional fuel delivery.

The disclosed EGR system 20 varies recirculation flow 53 by determining an engine operating condition and a total mass of fuel required for the engine condition. In the present embodiment, the pressure sensor 62 senses a pressure of the inlet flow 38. FIG. 2, line a depicts conventional engine where the total mass of fuel is distributed equally to each of combustion chambers 14a–e and recirculation combustion chamber 16. In the present invention, the total mass of fuel is distributed in unequally. FIG. 2, line b depicts the recirculation combustion chamber 16 receiving a smaller proportion of the total mass of fuel during lower load conditions relative to the combustion chambers 14a–e, line c. During a high load condition, the pressure sensor 62 will sense a high pressure in the inlet manifold 36. The total mass of fuel delivered in both the typical internal combustion engine and according to the present invention remains generally equal for an equivalent load condition. The reduction in fuel delivered to the combustion chambers 14a–e will be split five ways and therefore have little effect on the operation of those combustion chambers 14a–e. However, the increase in fuel delivered to the recirculation combustion chamber 16 will greatly increase the pressure in the recirculation combustion chamber 16. This increase in pressure will increase the pressure differential between the recirculation manifold 50 and inlet manifold 36. With the increased pressure differential more recirculation flow 53 will enter the inlet manifold 36. In lower load conditions recirculation flow 53 decrease with a decrease of fuel depicted in FIG. 2 line b. The resulting decrease of pressure in the recirculation manifold 16 will result in a decrease in the pressure differential between the recirculation manifold 16 and the inlet manifold 36. If no recirculation flow 53 is required, no fuel is delivered to the recirculation combustion chamber 16. During this mode of operation the engine 10 will be essentially operating on five combustion chambers 14a–e with the recirculation combustion chamber 16 acting as an air compressor.

The present invention may also operate to improve engine 10 operation during startup. The temperature sensor 82 senses the temperature of the recirculation flow 53 downstream of the EGR heat exchanger 78. The bleed valve 76 moves from the first bleed position to the second bleed position when the temperature of the bleed flow is below a predetermined position. In the second bleed position, no bleed flow 75 passes from the inlet conduit 34 into the front exhaust manifold 24a. As the temperature of the recirculation flow 53 in the supply conduit 56 increases above the predetermined temperature, the bleed valve 76 moves from the second bleed position to the first bleed position. In the second bleed position the EGR cooling system 60 decreases the temperature of recirculation flow 53 being delivered through the supply conduit 56.

The alternative embodiment in FIG. 3 further increases control of the recirculation flow 53' by allowing multiple recirculation combustion chambers 16' to increase mass of recirculation flow 53'. Further, the pumping device 84 may further control reciruclation flow both with and without the use of the EGR valve 54.

Other aspects, objects, and advantages of this invention can be obtained from a study of the drawings and the disclosure.

What is claimed is:

1. A method for controlling an exhaust gas recirculation system in an internal combustion engine having a plurality of combustion chambers being connectable to an exhaust system and an inlet system, at least one recirculation combustion chamber being connectable to the inlet system; said method comprising the steps:

determining an operating condition of said engine;
   determining a total mass of fuel required for said operating condition;
   distributing said total mass of fuel to said plurality of combustion chambers in non-equal proportions according to said operating condition, said recirculation combustion chamber receiving a larger proportion of said total mass of fuel where said engine operating in a predetermined upper range, said recirculation combustion chamber receiving an equal proportion of said total mass of fuel where said engine operating in a predetermined middle range, said recirculation combustion chamber receiving a smaller proportion of said total mass where said engine operating in a predetermined lower range.

2. The method for controlling an exhaust gas recirculation system as recited in claim 1 wherein the step of determining said operating condition being measuring a pressure of an inlet flow.

3. The method for controlling an exhaust gas recirculation system as recited in claim 1 wherein said determining operating condition being sensing a gas temperature of a recirculation flow.

4. The method for controlling exhaust gas recirculation as recited in claim 1 further comprising the steps of:

determining a speed of an engine; and further adjusting said mass of fuel delivered to said recirculation combustion chamber directly with said engine speed.

5. The method for controlling an exhaust gas recirculation system as recited in claim 1 further comprising the step of cooling a recirculation flow.

6. The method for controlling an exhaust gas recirculation system as recited in claim 5 wherein said step of cooling said recirculation flow is placing said recirculation flow into a heat exchange relationship with a bleed flow.

7. The method for controlling an exhaust gas recirculation system as recited in claim 6 further comprising the steps of:

increasing a pressure of said bleed flow; and
   cooling said bleed flow.

8. A system for controlling exhaust gas recirculation in an internal combustion engine, said system comprising:

a plurality of combustion chambers;
   an exhaust system being fluidly connectable with said combustion chambers;
   an inlet system being fluidly connectable with said combustion chambers;
   a recirculation combustion chamber being fluidly connectable with said inlet system;
   an engine operating condition sensing device being connectable with said engine, said engine operating condition sensing being adapted to sense an engine operating condition;
   a fuel delivery device, said fuel delivery device being fluidly connectable with said plurality of combustion chambers and said recirculation combustion chamber; and
   a controller connected to said fuel delivery device, said controller determining a total mass of fuel for according to a sensed engine operating condition, said controller determining an equal proportion of the total mass of fuel to be delivered to each of said combustion chambers and said recirculation combustion chamber, said controller adjusting said equal proportion of said total mass of fuel to be delivered to said combustion chambers inversely with said sensed operating condition, said controller adjusting said equal proportion of said total mass of fuel to be delivered to said recirculation combustion chamber in direct relation with said sensed operating condition.

9. The system for controlling exhaust gas recirculation as recited in claim 8 wherein said inlet system includes a pressure charging system being located upstream from a connection of said inlet system with said recirculation combustion chamber.

10. The system for controlling exhaust gas recirculation as recited in claim 8 wherein said fuel delivery device being a fuel injector.

11. The system for controlling exhaust gas recirculation as recited in claim 8 wherein said engine operating condition sensing device being adapted to sense an engine load.

12. The system for controlling exhaust gas recirculation as recited in claim 11 wherein said engine load being determined by a pressure sensor being positioned in said inlet system.

13. The system for controlling exhaust gas recirculation as recited in claim 8 further comprising an exhaust gas recirculation cooling system being intermediate said recirculation manifold and said inlet system, said exhaust gas recirculation cooling system being adapted to cool a recirculation flow.

14. The system for controlling exhaust gas recirculation as recited in claim 13, said exhaust gas recirculation cooling system having a bleed conduit being connectable intermediate said inlet system and said exhaust system, a supply conduit being connectable intermediate said recirculation manifold and said inlet system, said bleed conduit being in a heat exchange relationship with said supply conduit.

15. The system for controlling exhaust gas recirculation as recited in claim 13 further comprising a control valve being positioned intermediate said inlet system and said exhaust gas recirculation cooling system, said control valve being connectable with said controller, said control valve being movable in a range from a first position and a second position, said first position fluidly connecting said recirculation combustion chamber with said inlet system, said second position preventing fluid communication between said recirculation combustion chamber and said inlet system.

16. The system for controlling exhaust gas recirculation as recited in claim 15 further comprising a temperature sensor being connected intermediate said exhaust gas recirculation cooling system and said inlet system, said sensor being connected to said controller, said sensor being adapted to measure a temperature of recirculation flow.

* * * * *